United States Patent [19]

Harbour

[11] Patent Number: 4,626,041
[45] Date of Patent: Dec. 2, 1986

[54] STRAIN GAUGE ASSEMBLIES

[75] Inventor: John Harbour, Chippenham, Great Britain

[73] Assignee: TRW Probe Electronics Co. Ltd., Gloucestershire, England

[21] Appl. No.: 616,956

[22] Filed: Jun. 4, 1984

[30] Foreign Application Priority Data

Jun. 3, 1983 [GB] United Kingdom ............... 8315346

[51] Int. Cl.$^4$ ................................................ B60T 8/00
[52] U.S. Cl. ..................................... 303/100; 303/103
[58] Field of Search ................ 188/181 T; 303/24 B, 303/100, 103, 106, 112

[56] References Cited

U.S. PATENT DOCUMENTS

| 2,992,860 | 7/1961 | Hirzel ................................. 303/24 B |
| 3,203,234 | 8/1965 | Westcott, Jr. et al. .......... 73/863.52 |
| 3,365,689 | 1/1968 | Kutsay ..................................... 338/5 |
| 3,655,340 | 3/1972 | Bradley . |
| 3,695,096 | 10/1972 | Kutsay ..................................... 73/761 |
| 3,780,817 | 12/1973 | Videon . |
| 3,800,895* | 4/1974 | Gale . |
| 3,878,908 | 4/1975 | Andersson, et al. .............. 177/136 |
| 4,166,997 | 9/1979 | Kistler .................................... 338/5 |

FOREIGN PATENT DOCUMENTS 2917967 11/1980 Fed. Rep. of Germany .
2520870 8/1983 France .

OTHER PUBLICATIONS

Transducer Tutorial article "Modern Strain Gauge Transducer . . . Their Design and Constructions" *Epsilonics*, Jul. 1982.

*Primary Examiner*—Duane A. Reger
*Attorney, Agent, or Firm*—Yount & Tarolli

[57] ABSTRACT

Strain gauge transducers (15) are fitted to the leading and trailing faces of a vehicle axle between each wheel (14) and the adjacent suspension (13). They have strain gauges (6, 7, 8, 9) in balanced bridge formation and their orientation is such that their outputs can be combined in one circuit (16, 17, 18) to produce an indication of axle loading and in another circuit to produce an indication (26) of torsion, these signals not being influenced by irrelevant strains. The information from the transducers can be combined to indicate individual axle loading, and total loading, and the torsional signal can be used in an anti-skid braking system.

5 Claims, 7 Drawing Figures

STRAIN GAUGE ASSEMBLIES

This invention relates to strain guage assemblies.

Strain guages have many applications, but one of their problems is that a member to which they are attached may be subject to several different strains, the basic four being tensile/compression, bending, shear and torsion. It is often desirable to determine individual ones of these strains, but a reading from any single transducer is often a combination of strains.

It is the aim of this invention to provide an arrangement of transducers from which individual strains can be readily determined.

According to the present invention there is provided a stain guage assembly applied to a mechanical system having a stator and a rotor co-axially carried thereby, the rotor and stator being subject to loads in opposite directions transverse to the axis but offset from one another along the axis, and there being variable torsional loads between the stator and the rotor, wherein two strain guage sensors, each providing a balanced bridge circuit, are arranged symmetrically on the stator on opposite sides of the plane containing the common axis and the rectilinear load vectors, and between said vectors.

A particular application for which this is suitable is the axle and wheel of a vehicle, the axle being the stator, the wheel the rotor, the weight of the vehicle providing the load on the axle or stator, the ground reaction the load on the wheel or rotor, and a brake the variable torsional load. The stain guage sensors or transducers are mounted on the forward and reverse sides of the axle, outboard of the associated suspension point. Their outputs can be combined to give comprehensive information, as described below, on the local loading, and if such arrangements are provided on more, or all, axles then an even fuller picture can be obtained. It is also possible to use the outputs to govern an anti-skid braking system.

For a better understanding of the invention, one embodiment will now be described, by way of example, with reference to the accompanying drawings, in which.

Figure 4:
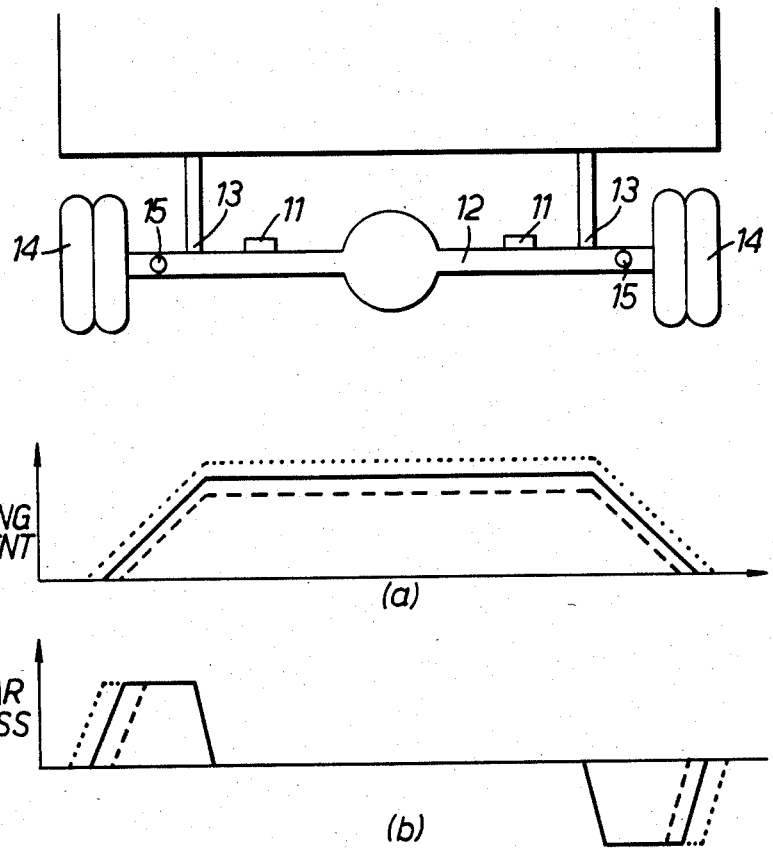
Figure 5:
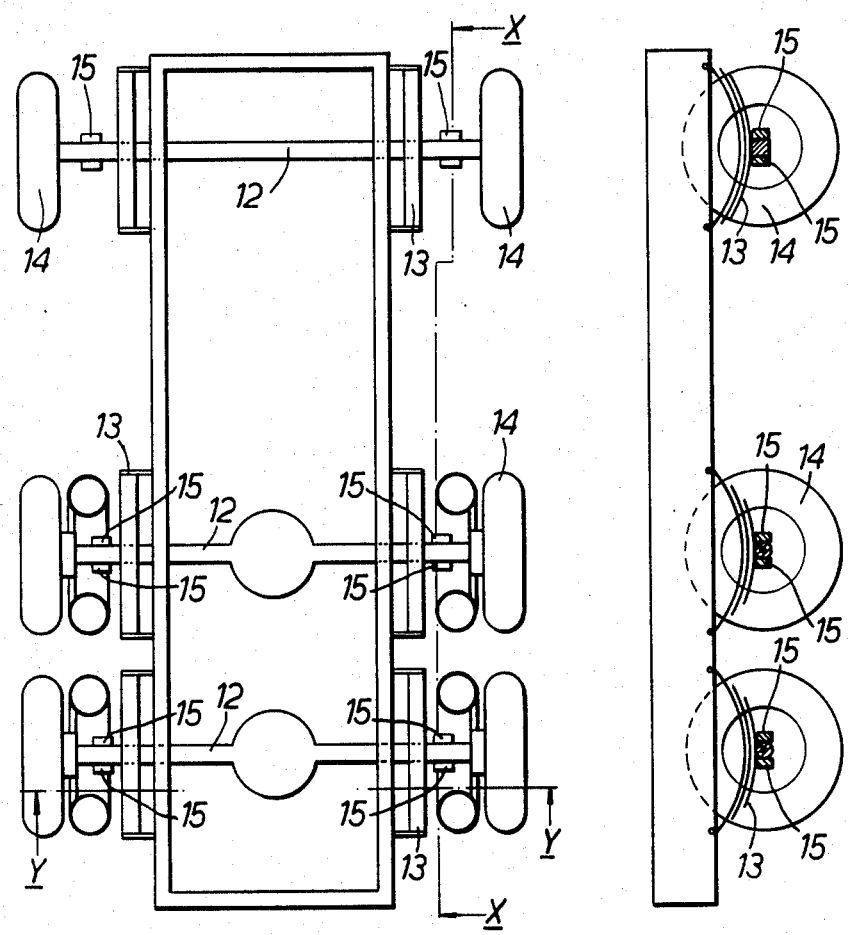
Figure 5:
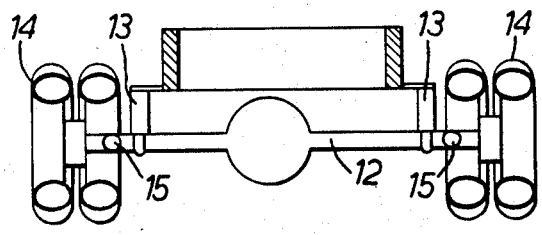
Figure 6:
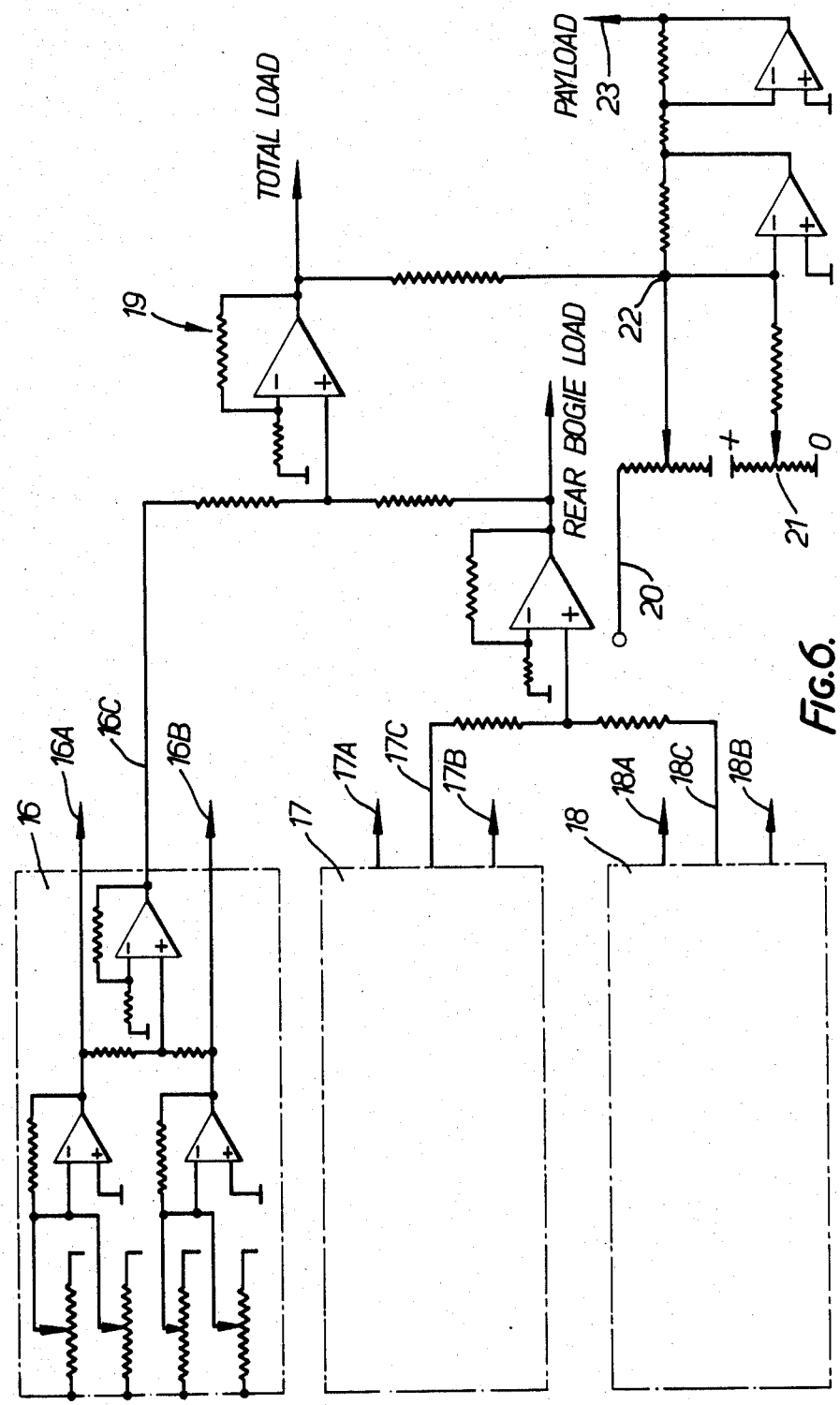
Figure 7:
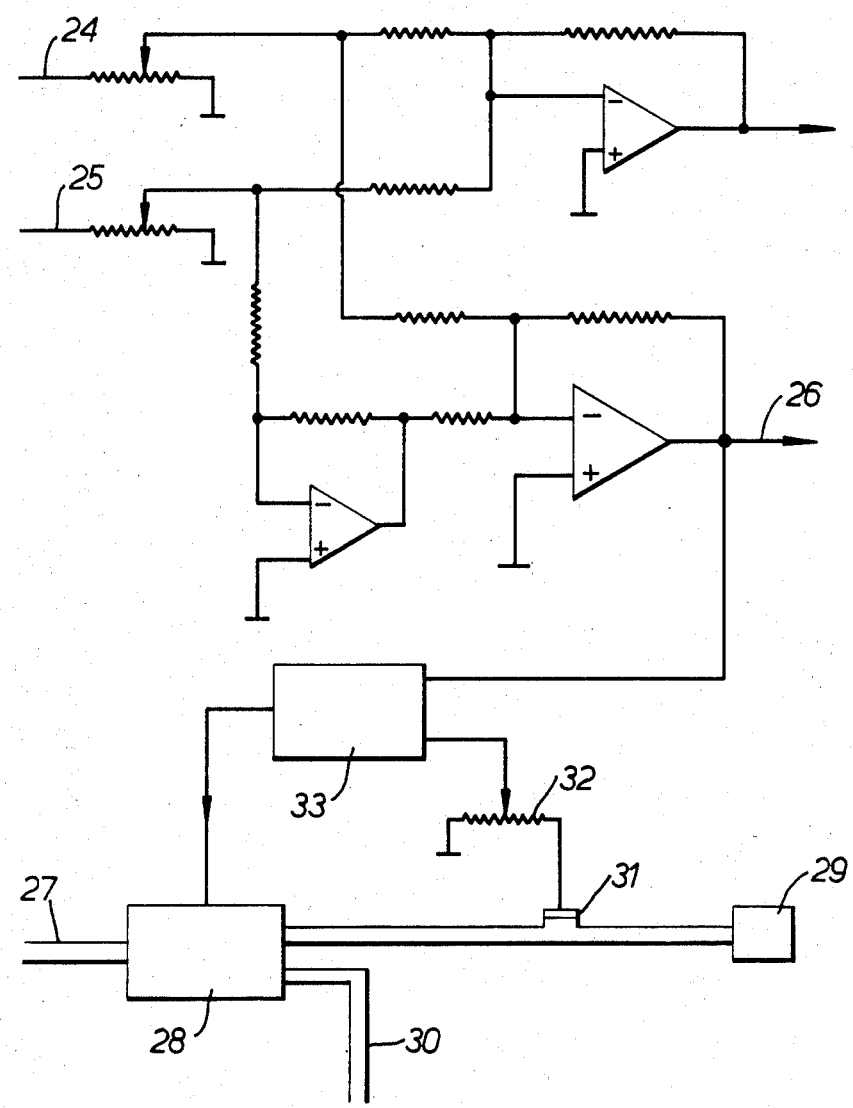

FIG. 4 is a diagrammatic end view of a vehicle with sensors fitted, and associated bending moment and stress characteristics, FIG. 5 shows plan and sectional views of a vehicle chassis equipped with sensors in an arrangement according to the invention, FIG. 6 is a diagram of a circuit for precessing information from such an arrangement of sensors, and FIG. 7 is a diagram of an anti-skid circiut using information from such sensors.

Figure 1:
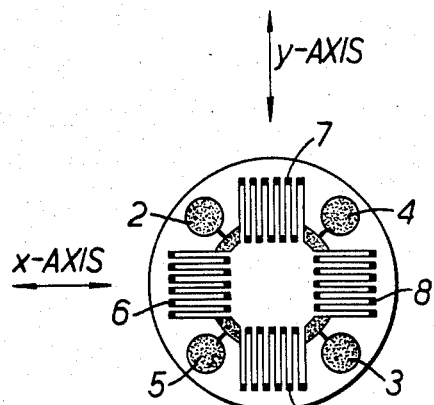
FIG. 1 is face view of a 'rosette' strain sensor.
Figure 2:
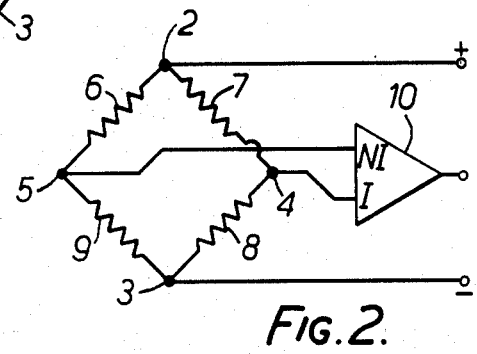
FIG. 2 is a circuit diagram of the sensor of FIG. 1.

The sensor of FIG. 1 has a disc body 1 with four terminals 2, 3, 4 and 5 thereon at the corners of a square. One diagonally opposite pair 2, 3 is for a DC supply, while the other pair 4, 5 is for the output derived from the resistive elements 6, 7, 8 and 9 connected in bridge fashion between the terminals. The resistances of these elements change in accordance with the strain to which they are subjected along the respective side of the square. the electrical circiut is shown in FIG. 2, from which it will be seen that the output from the terminals 4, 5 is to the inverting and non-inverting inputs of a differential amplifier 10.

For convenience, the direction across the resistors 6 and 8 will be referred to as the x-axis and that across the resistors 7 and 9 as the y-axis.

The strain sensor is thus in 'rosette' form, making a balanced bridge circuit, and when there is no strain present, there is no electrical output. Also, when there is tension or compression strain at 45° to the x and y axes in affects all elements equally and produces a zero output.

This sensor can therefore produce a certain amount of information on the strain at a particular point, but it is not comprehensive and it is ambiguous.

In practical applications, the aim is often to measure a component of load (e.g. vehicle axle load), while trying to make the measurement independent of other influences. A transducer of the FIG. 1 type can be inserted in an existing structural member subject to varying combinations of the four basic strain forms—tensile/compression, bending, shear and torsion—but unless it can be applied to detect one form of strain and reject the others, accurately sensing a load is not possible. The aim should be to select the stress form which is closely proportional to the load and independent of other variable factors such as wear, friction and the position of effective fulcra, and to reject the stress forms which might not be independent of the variable factors.

Figure 3:
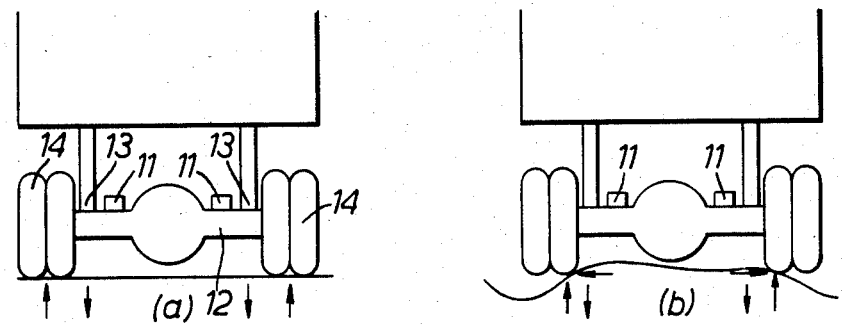
FIG. 3 shows diagrammatic end views of a vehicle.
Figure 3:
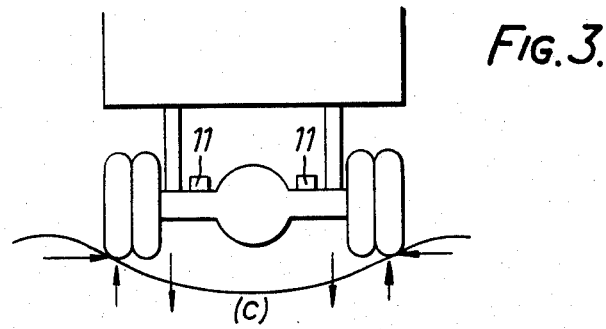

By way of example, FIG. 3 shows how a well known method of sensing vehicle loading is affected by ground conditions. Sensors 11 fitted to the upper surface of an axle 12, symmetrically between suspension points 13, are sensitive to tensile/compressive strains in that surface resulting from bending of the axle. The bending moment is proportional to the load and the separation of the fulcra, assuming that the axle is effectively simply supported. The suspension points 13 are constant, but the effective points of contact of the road wheels 14, which provide the other fulcra, vary according to the ground on which they run, as can be seen by diagrams (a), (b) and (c). This produces scale errors in the system shown, and requires that it be used only on flat ground, as in diagram (a). Even so, the accuracy is limited and does not permit precision weighing, or weighing in non-ideal circumstances.

FIG. 4 shows the distribution of stress (and hence strain) in a uniform vehicle axle, referenced as in FIG. 3, and with additional sensors 15 on a vertical face of the axle, between the suspension points 13 and the wheels 14. The upper graph (a) shows the bending moment as a solid line, with dotted and dashes lines showing the bending moment encountered with effective wider and narrower wheel spacing (as shown in FIG. 3). It will be seen that the bending moment between the suspension points is constant for a given wheel spacing but is dependent on the spacing.

The lower graph (b) shows the shear stress, which is constant, depending only on the load between each wheel 14 and the suspension 13, and therefore the load could be sensed by the shear strain sensors 15.

However, the axle will carry, in many cases, a brake assembly and this area of the axle is thus subject to substantial torsional loads. These may be present even in the absence of a brake assembly or its operation, due to friction in wheel bearings.

However, by equipping vehicles with sensors to detect shear strain in the manner shown in FIG. 5, the shear due to torsion effects can be rejected and the principal sources of errors associated with the method of FIG. 3 can be eliminated. All the sensors 15 in FIG. 5 are mounted on fore and aft faces of the axles 12 between the wheels 14 and the suspension mounting 13, with x-axes at 45° to the axis of each axle. Also, they are connected so that the sum of the outputs of each sensor of a fore and aft pair will give an indication of the load on each wheel individually. Outputs of the sensors can then be combined by suitable electronic means to indicate as follows:

(a) Individual wheel loads
(b) individual axle loads
(c) individual bogie loads
(d) gross vehicle weight
(e) by subtraction of tare weight from (d), the vehicle gross payload
(f) by subtraction of fuel tank weight and other known burdens from (e); the vehicle net payload.

Further and instead of, or in adition to, the above, the outputs of each fore and aft pair of sensors can be combined to give a measure of the torsional strain at each individual wheel. Provided that any brake reaction devices are placed inboard of the sensors, there will then be available a measure of the braking effect at each wheel due to the driver's attempt to slow the vehicle. If this braking effect is not as great as that which could be calculated from the pressure or other mesurable parameters in the breaking system, they it is likely that the wheel is skidding. This can then be used as a basis for anti-skid controls.

FIG. 6 is a diagram of a circuit for producing the information (a) to (f) from sensors 15 mounted on a three axle lorry as in FIG. 5. The components are shown in conventional form and will not be described in detail.

Each axle has its respective circuit 16, 17 and 18 for combining the four sensor outputs, only the circuit 16 for the front axle being shown in any detail. The circuits 17 and 18 for the two rear axles will be identical, although each are provided with individual scaling potentiometers. They each have four inputs (from the sensors on the near side leading and trailing faces and from those on the off side leading and trailing faces, in sequence down the lefthand side), and they provide three outputs 16A, 16B, 16C and so on, corresponding to the loads on the near side wheel, the offside wheel and the axle as a whole, respectively.

The axle load signals are further combined in circuit 19 to produce a signal corresponding to the total vehicle load.

Auxiliary to this, the fuel guage can provide a positive signal on line 20, and the tare weight can be preset into potentiometer 21. These together are differenced from the total vehicle load signal (negative in this example) at point 22 and after amplification a payload signal is available at 23.

FIG. 7 is a diagram of an anti-skid circuit for one wheel and brake assembly, receiving signals from the associated leading and training sensors on lines 24 and 25. The additive circuit for producing the wheel load signal is shown again, but there is also a subtractive circuit for producing a torsion signal at 26. a brake fluid line 27 leads to a pressure regulator 28 and thence to a slave cylinder 29, with a return 30 to a hydraulic reservoir. Between the regulator 28 and the cylinder 29 there is a pressure sensor 31 which provides, through a scaling potentiometer 32, one input to a differencing circuit 33. The other input is the torsion signal, and the output is a control signal to the pressure regulator 28. The brake is thus subject to the torsion in a manner to avoid wheel skid.

I claim:

1. An anti-skid brake apparatus for a vehicle having an axle for supporting vehicle load at support locations, each end of the axle rotatably carrying a wheel, each wheel having an associated hydraulically actuatable brake means, actuation of the brake means effecting torsional loads between its associated wheel and axle, said apparatus comprising:

a strain guage assembly including first strain guage bridge means mounted to said axle at a location between a selected wheel and a support location and second strain guage bridge means mounted to said axle at a location diametrically opposed to said first strain guage bridge means, said first strain guage bridge means and said second strain guage bridge means each outputting an electical signal indicative of shear strain in said axle;

processing circuit means for porcesing the output signals from said first strain guage bridge means and from said second strain guage bridge means and for putputting an electrical signal indicative of torsional load in said axle;

electically controllable fluid pressure regulator means operatively connected to a brake fluid line, to a fluid actuating device of the brake means associated with said selected wheel, and to a brake fluid reservoir for controlling fluid pressure supplied to the fluid actuating device in response to an electrical control signal;

pressure sensing means for sensing fluid pressure outputted from said fluid pressure regulator means and for generating an electrical signal indicative of the sensed fluid pressure; and regulator control circuit means operatively connected to said processing circuit means, said pressure sensing means, and said fluid pressure regulator means for determining an actual braking effect from the output signal from said processing circuit means, for determining a requested braking effect from the output signal from said pressure sensing means and for generating said electrical control signal to control said fluid pressure regulator means responsive to the determined actual braking effect and the requested braking effect to prevent said selected wheel from skidding.

2. The anti-skid brake apparatus of claim 1 wherein said first strain guage bridge means and said second strain guage bridge means each include four variable resistors electrically connected in a balanced bridge network and arranged in a square, the sides of the square oriented approximately 45 degrees from the longitudinal axis of said axle.

3. The anti-skid brake apparatus of claim 2 wherein said first strain guage gridge means and said second strain guage bridge means lie in planes substantially parallel with a plane of rectilinear load vectors acting on said axle.

4. The anti-skid brake apparatus of claim 1 wherein said processing circuit means further includes means for generating electrical signals indicative of (i) load on each wheel and (ii) load on said axle.

5. A load measuring apparatus for use in measuring a vehicle load, the vehicle having a plurality of spaced apart parallel axles, each axle supporting a portion of the vehicle load at support locations on the axle, each end of each axle rotatably carrying an associated wheel, actuation of a hydraulically actuatable brake means associated with a wheel of the vehicle effecting a torsional load between such wheel and its associated axle, said apparatus comprising:

a plurality of first strain guage bridge means, each end of an axle having an associated first strain guage bridge means mounted to a front side of the axle and located between a support location and the associated wheel for generating an electrical signal indicative of shear strain in its associated axle;

a plurality of second strain guage bridge means, each first strain guage bridge means having an associated second strain guage means mounted to a rear side of its associated axle and diametrically opposed thereto, each second strain guage bridge means generating an electrical signal indicative of shear strain in its associated axle;

fuel measuring means for generating an electrical signal indicative of the quantity of fuel carried by the vehicle;

tare weight signal generating means for generating an electrical signal indicative of vehicle tare weight which includes the weight of the parallel axles;

processing circuit means electrically connected to each first strain guage bridge means, to each second strain guage bridge means, to said fuel measuring means, and to said tare weight signal generatingmeans for generating electrical signals indicative of (i) load on each wheel, (ii) load on each axle, (iii) total vehicle load, and (iv) vehicle payload, and for outputting an electrical signal indicative of torsional strain in the axle associated with a wheel having an actuatable brake means;

electrically controllable fluid pressure regulator means operatively connected to a brake fluid line associated with the actuatable brake means, to a fluid actuating device of the brake means and to a brake fluid reservoir for controlling fluid pressure supplied to the fluid actuating device in response to an electrical control signal;

pressure sensing means for sensing the fluid pressure outputted from said fluid pressure regulator means and for generating an electrical signal indicative of the sensed fluid pressure; and regulator control circuit means operatively connected to said processing circuit means, to said pressure sensing means, and to said fluid pressure regulator means for determining an actual braking effect from the output signal from said processing circuit means, for determining a requested braking effect from the output signal from said pressure sensing means and for generating said electrical control signal to said fluid pressure regulator means responsive to the determined actual braking effect and the requested braking effect to prevent such wheel from skidding.

* * * * *